United States Patent [19]
Dixon

[11] Patent Number: 5,737,121
[45] Date of Patent: Apr. 7, 1998

[54] REAL TIME SCANNING OPTICAL MACROSCOPE

[76] Inventor: Arthur E. Dixon, 601 Stonebury Crescent, Waterloo, Ontario, Canada, N2K 3R2

[21] Appl. No.: 674,145

[22] Filed: Jul. 1, 1996

Related U.S. Application Data

[62] Division of Ser. No. 117,797, Sep. 8, 1993, Pat. No. 5,532,873.

[51] Int. Cl.$^6$ ............................ G02B 21/06; G02B 21/00
[52] U.S. Cl. ........................... 359/388; 359/368; 359/385
[58] Field of Search .................................. 359/368, 377, 359/372–374, 379, 381, 385–389, 660, 205–208; 356/72, 318, 326, 417, 376; 250/201.3, 216, 234

[56] References Cited

U.S. PATENT DOCUMENTS

| | | | |
|---|---|---|---|
| 5,067,805 | 11/1991 | Corle et al. | 359/368 |
| 5,101,295 | 3/1992 | Lichtman et al. | 359/368 |
| 5,225,923 | 7/1993 | Montagu | 359/368 |
| 5,386,112 | 1/1995 | Dixon | 359/368 |

*Primary Examiner*—Thong Nguyen

[57] ABSTRACT

A new real-time confocal scanning laser macroscope is disclosed which images macroscopic specimens in reflected light and fluorescence or photoluminescence. The optical arrangement of a Nipkow disk microscope has been altered to include a telecentric scan lens which enables a large area of a specimen to be imaged with micron resolution, and when interchanged with a microscope objective, allows a small area of the specimen to be imaged with submicron resolution.

5 Claims, 3 Drawing Sheets

REAL TIME SCANNING OPTICAL MACROSCOPE

TECHNICAL FIELD

This is a division of U.S. application Ser. No. 08/117,797, filed Sep. 8, 1993, now U.S. Pat. No. 5,532,873, granted Jul. 2, 1996. This invention relates to the fields of scanning beam microscopy and scanning beam imaging systems for imaging both microscopic and macroscopic specimens.

BACKGROUND OF THE INVENTION

One embodiment of confocal scanning-beam optical microscopes is the class of microscopes known as Nipkow Disk microscopes. The microscopes in this class were described by Gordon Kino[1], and a particularly simple and useful embodiment is the real time scanning optical microscope described in FIG. 2 of Kino's paper. These microscopes are different from the confocal microscope described in U.S. Pat. No. 5,532,873 in that a large number of pinholes in a rotating disk are the source of a large number of scanning beams which are focused on the specimen simultaneously, and reflected or fluorescent light beams from these focused spots are detected simultaneously.

[1] 1. G. S. Kino, "Efficiency in Nipkow Disk Microscopes", in "The Handbook of Biological Confocal Microscopy" pp. 93–99, IMR Press, Madison, Wis. 53706, Edited by J. Pawley, 1989.

Two main types of Nipkow Disk microscopes exist. In the Tandem Scanning Reflected Light Microscope (TSM), light entering the microscope passes through a set of pinholes in an illuminated area on one side of the disk on its way towards the microscope objective, and then returns through a conjugate set of pinholes on the other side of the disk on its way back from the microscope objective to the eyepiece. The TSM provides good image contrast, but has a complex optical path that is difficult to align. In the Real Time Scanning Optical Microscope (RSOM), light is detected through the same pinhole from which a given area of the specimen was illuminated. The RSOM has a simpler optical path, and is self-aligning, since light passes through the same pinhole in both directions, but reflections from the top of the disk can be a problem. Both of these types of Nipkow Disk systems are microscopes, i.e. they use microscope objectives, and the field of view is limited to that normally achieved in an optical microscope.

A Prior Art Nipkow Disk system is shown in FIG. 1, following Kino[1]. Light from arc lamp 102 passes through a lens 104 and polarizer 106, and is partially reflected by beamsplitter 108 onto Nipkow Disk 110, illuminating area 111 on the disk. The disk is rotated by motor 112. Light 113 from one of the illuminated pinholes (shown as solid lines with arrows) expands through a quarter-wave plate 114 and enters the microscope objective 116, which focuses it to a diffraction-limited spot on specimen 118. Light reflected from that spot on the specimen is collected by the microscope objective, passes back through the quarter-wave plate, and is focused on the same pinhole in the Nipkow Disk. After passing through the pinhole, it is partially transmitted by beamsplitter 108, and is focused by lens 122 onto a real image plane where the image can be viewed by an eyepiece 128, or can be detected with a detector array. At the same time, light from the other pinholes in the illuminated area of the disk also passes through the system, and is focused to points on the real image plane. When viewed through the eyepiece, the eye averages the many moving spots in the image plane, to form a real-time image. In this embodiment, the Nipkow Disk is tilted such that most of the light reflected from the top of the disk hits the edge of stop 120, and does not pass through lens 122. This increases contrast in the image. Polarizer 106, quaffer-wave plate 114 and analyzer 124 are used in combination to further reduce the amount of light reflected or scattered from the Nipkow Disk which reaches the detector. Light returning from the specimen has passed through the quarter-wave plate twice, such that its polarization has been rotated to be at right angles to the polarization of the incoming light, and the analyzer is then rotated to reject light with the same polarization as the incoming light, but to pass light polarized at right angles to that of the incoming light. This further reduces the amount of light reflected from the Nipkow disk that reaches the detector, and further increases contrast in the image.

[1] 1. G. S. Kino, "Efficiency in Nipkow Disk Microscopes", in "The Handbook of Biological Confocal Microscopy" pp. 93–99, IMR Press, Madison, Wis. 53706, Edited by J. Pawley, 1989.

OBJECTS OF THE INVENTION

It is an object of this invention to provide a confocal real-time scanning beam optical imaging system for macroscopic specimens.

It is a further object of this invention to provide a confocal real-time scanning beam optical imaging system with a wide range of magnification.

It is a further object of this invention to provide a confocal real-time fluorescence or photoluminescence imaging system which images a large area of a specimen with good resolution, and then allows a small, selected area of the specimen to be imaged at high magnification and high resolution.

It is a further object of this invention to provide a novel method of parfocalizing a microscope objective and a scan lens, such that both can be easily interchanged for use in a scanning beam imaging system.

DESCRIPTION OF THE INVENTION

The present invention is a practical real-time confocal scanning laser macroscope with a wide range of magnification.

Figure 1:
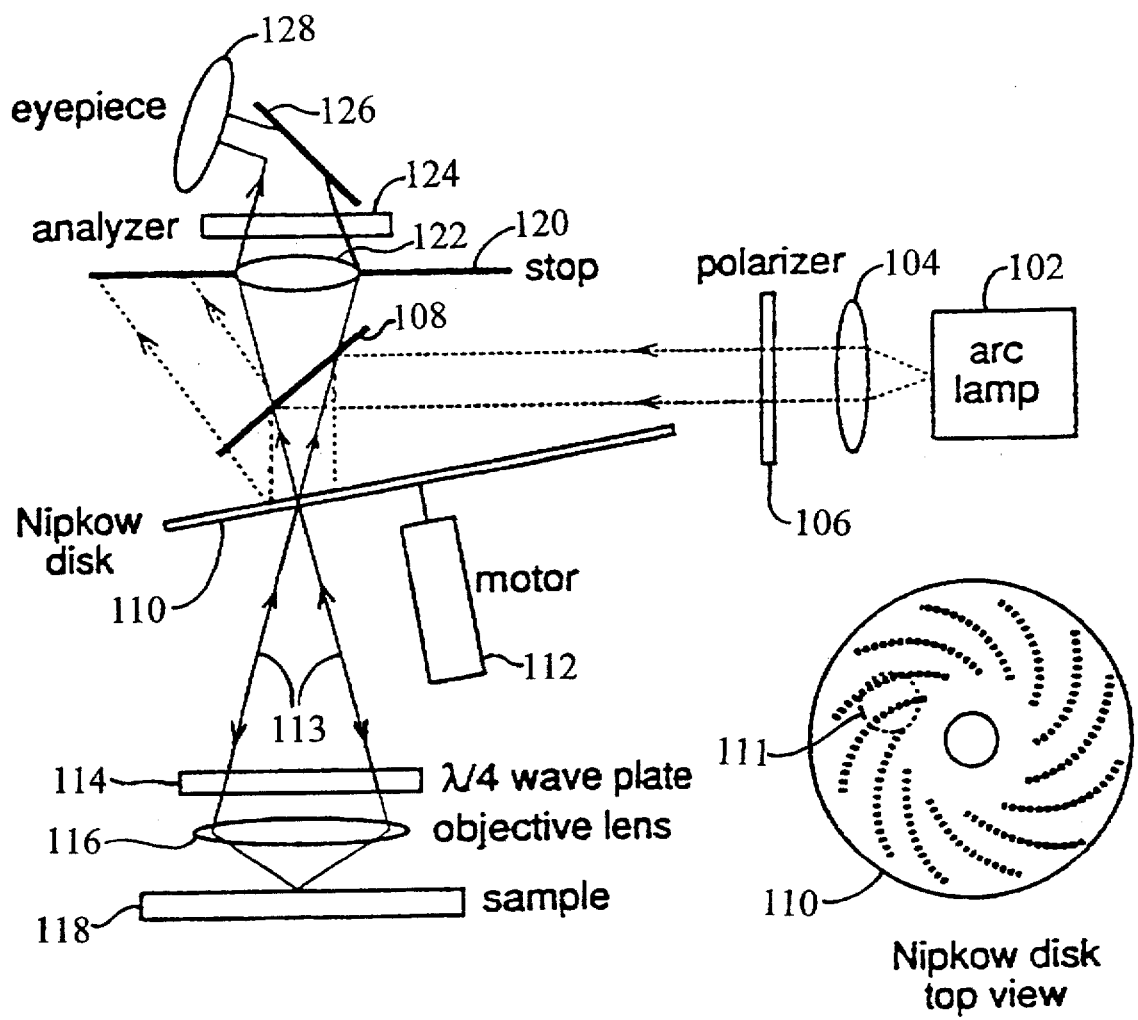
FIG. 1 shows a prior art real time confocal scanning-beam optical microscope.
Figure 2:
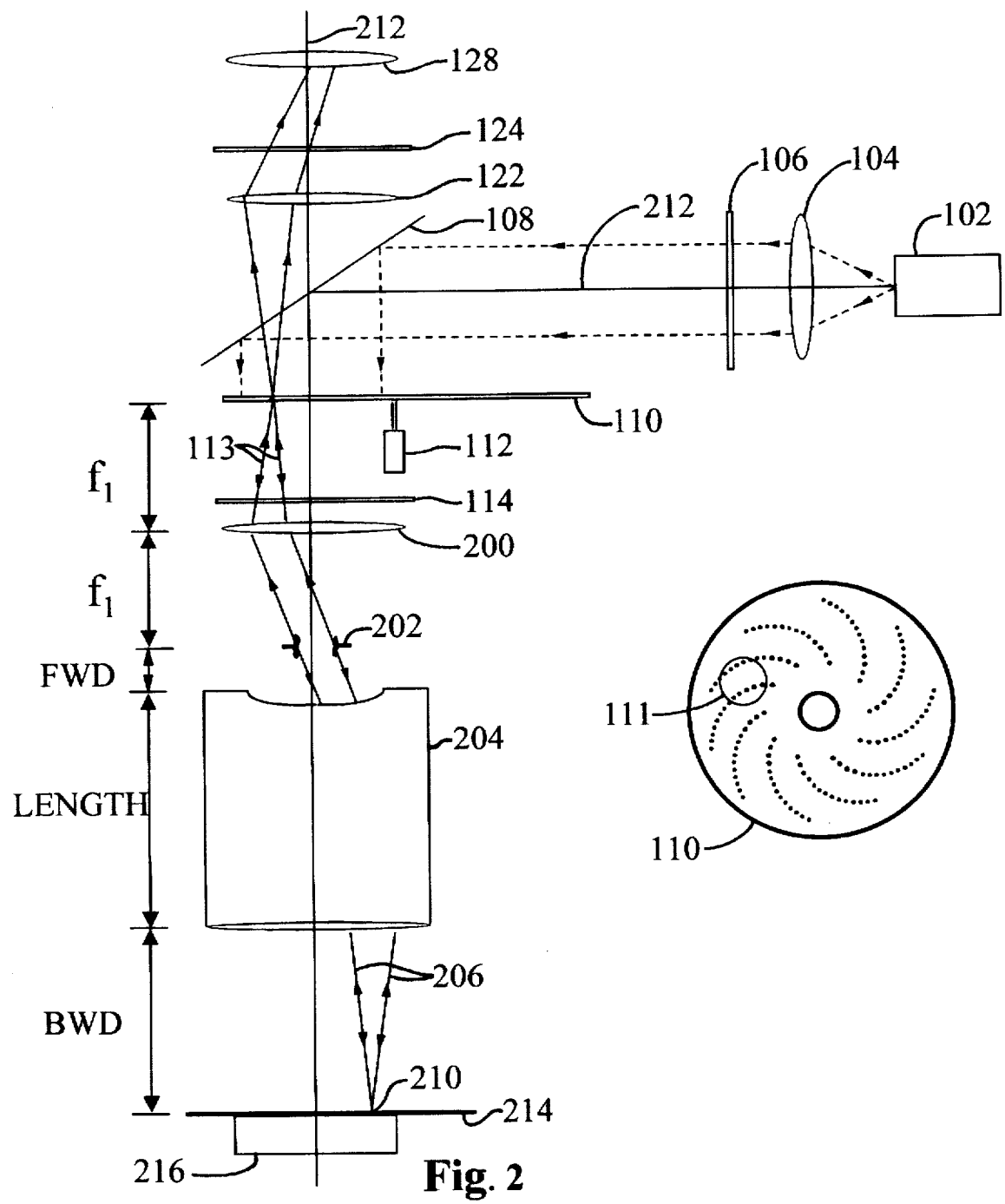
FIG. 2 shows a first preferred embodiment of the present invention, a real-time scanning optical macroscope.

A first preferred embodiment of the present invention is shown in FIG. 2. Light from arc lamp 102 passes through lens 104 and polarizer 106, and is partially reflected by beamsplitter 108 onto Nipkow Disk 110, illuminating area 111 on the disk. The disk is rotated by motor 112. Light 113 from one of the illuminated pinholes (shown as solid lines with arrows) expands through a quarter-wave plate 114 and enters focusing lens 200 of focal length $f_1$ placed a distance $f_1$ below the Nipkow Disk. A telecentric scan lens 204 is placed below focusing lens 200 such that the position of its entrance pupil 202 is a distance $f_1$ from focusing lens 200, and that the illuminated area 111 on Nipkow Disk 110, focusing lens 200, and telecentric laser scan lens 204 are coaxial with each other and with the optic axis 212 of the macroscope. (Note that entrance pupil 202 as indicated on the figure simply indicates the position of the entrance pupil. A real stop is not always placed at this position.) Focusing lens 200 changes the light expanding from the pinhole into a parallel beam that crosses the optic axis at the position of the entrance pupil of telecentric scan lens 204. The telecentric scan lens focuses the light to a diffraction-limited spot 210 on specimen 214 which is mounted on focusing stage 216. Light reflected from that spot on the specimen is collected by the scan lens, passes back through focusing lens 200 and quarter-wave plate 114, and is brought to a focus on the same pinhole in the Nipkow Disk. After passing through the pinhole, it is partially transmitted by beamsplitter 108, and is focused by lens 122 onto a real image plane (not shown) where the image can be detected with a detector array, or it can be viewed with eyepiece 128. At the same time, light from the other pinholes in the illuminated area of the disk also passes through the system, and is focused to points on the real image plane. When viewed through the eyepiece, the eye averages the many moving spots in the image plane, to form a real-time image. Polarizer 106, quarter-wave plate 114 and analyzer 124 are used in combination to reduce the amount of which reaches the detector after being reflected or scattered from the Nipkow Disk. Light returning from the specimen has passed through the quarter-wave plate twice, such that its polarization has been rotated to a direction at right angles to the polarization of the incoming light (which has been polarized by polarizer 106), and the analyzer is then rotated to reject light with the same polarization as the incoming light, but to pass light polarized at right angles to that of the incoming light.

Figure 3:
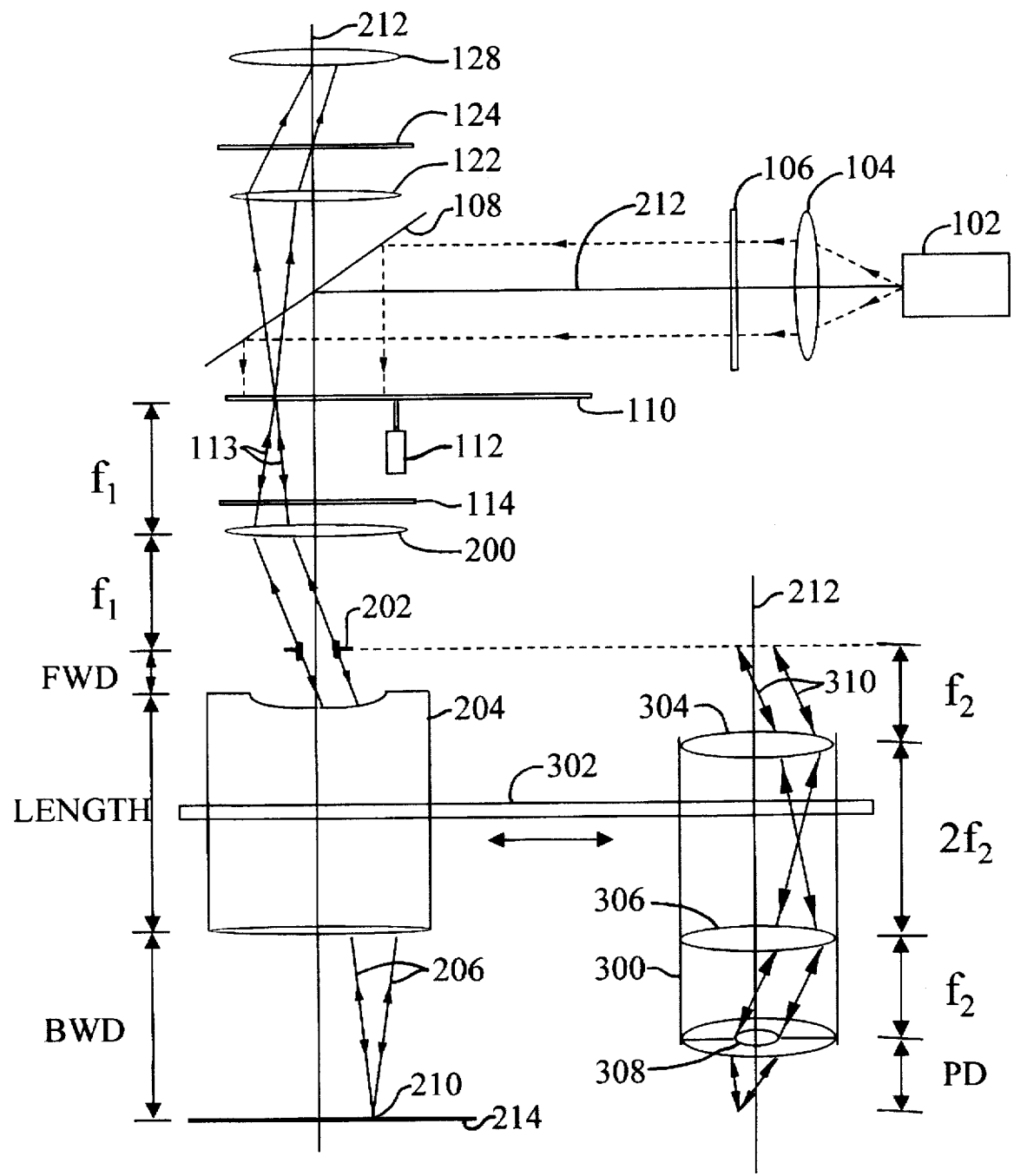
FIG. 3 shows a second preferred embodiment of the present invention, a real-time scanning optical macroscope with a very wide range of magnification.

A second preferred embodiment of the present invention is shown in FIG. 3. In this embodiment, a confocal image of a large area of specimen 214 is recorded using telecentric scan lens 204. In order to record a very high resolution image of a small area of the specimen, optical subassembly 300 is interchanged with telecentric scan lens 204. Optical subassembly 300 is comprised of microscope objective 308 and lenses 304 and 306, of focal length $f_2$. The optical subassembly and telecentric scan lens are rigidly attached to a mechanical slide or turret 302, which enables the positions to be interchanged, and the optical subassembly is attached to the mechanical slide or turret such that, after interchanging positions with the telecentric scan lens, lens 304 is a distance $f_1+f_2$ below focusing lens 200. Lenses 304 and 306 are placed a distance $2f_2$ apart, and a distance $f_2$ above the entrance pupil of microscope objective 308.

The optical subassembly can be made parfocal with the telecentric scan lens if lenses 304 and 306 are chosen with focal length that satisfies the equation FWD+LENGTH+BWD=$4f_2$+PD, where FWD is the Front Working Distance of the telecentric scan lens, BWD is the Back Working Distance of the telecentric scan lens, and LENGTH is the physical length of the telecentric scan lens, measured such that FWD+LENGTH+BWD is the distance from the position of entrance pupil 202 to the focus spot 210. Note that conventional usage for the terms "Back" and "Front" when referring to a scan lens is opposite to the convention applied to microscope objectives. PD is the distance from the entrance pupil of microscope objective 308 to its focal plane on the specimen. The light beam 310 is shown passing through the optical subassembly as it would when the position of the optical subassembly is interchanged with that of the telecentric scan lens.

All of the embodiments shown in the figures are based on an infinity-corrected optical design, however non-infinity corrected versions are also possible. Non-telecentric scan lenses can also be used. The light source shown is an arc lamp, however other light sources can also be used, including laser sources. Reflecting optics can also be used.

The term scan lens, as used in this document, describes a lens that is normally used for scanning a parallel beam of light and has a combination of wide angular field, a flat image plane, and an external aperture stop (at which position a scanning mirror is often placed). Although many laser scan lenses are monochromatic, color-corrected scan lenses are also available.

Several embodiments of a novel real-time scanning optical macroscope for imaging microscopic and macroscopic specimens have been disclosed.

Having described preferred embodiments of a new real-time scanning optical macroscope for imaging microscopic and macroscopic specimens, constructed in accordance with the present invention, it is believed that other modifications, variations, and changes will be suggested to those skilled in the art in view of the teachings set forth herein. It is therefore to be understood that all such variations, modifications, and changes are believed to fall within the scope of the present invention as defined by the appended claims.

I claim:

1. A real-time scanning optical macroscope or imaging system comprising:

means for supporting a specimen to be observed and measured;

an illumination source for producing a light beam directed toward a rotating Nipkow disk, said Nipkow disk containing pinholes, said pinholes causing said beam to become a plurality of expanding beams that are directed toward said specimen, said specimen being located on a side of said Nipkow disk opposite to said source;

a scan lens with a focusing lens rigidly mounted a distance equal to its focal length above an entrance pupil of said scan lens, and further placed such that said focusing lens is a distance equal to its focal length below said Nipkow disk, such that said focusing lens and said scan lens in combination focus the expanding beams from said Nipkow disk to diffraction-limited spots in a prescribed specimen plane;

means for focusing the light returning through said Nipkow disk from said diffraction-limited spots in said specimen plane to produce a real image; and means for at least one of detecting and viewing said real image.

2. The real-time scanning optical macroscope or imaging system of claim 1 wherein said scan lens is a telecentric scan lens.

3. A real-time scanning optical macroscope or imaging system comprising:

means for supporting a specimen to be observed and measured;

an illumination source for producing a light beam directed toward a rotating Nipkow disk, said Nipkow disk containing pinholes, said pinholes causing said beam to become a plurality of expanding beams that are directed toward said specimen, said specimen being located on a side of said Nipkow disk opposite to said source;

a scan lens with a focusing lens rigidly mounted a distance equal to its focal length above an entrance pupil of said scan lens, and further placed such that said focusing lens is a distance equal to its focal length below said Nipkow disk;

a microscope objective;

means for interchanging said microscope objective and said scan lens, such that either said microscope objective or said scan lens can be moved into position to focus the light beams to diffraction-limited spots in a prescribed specimen plane;

means for focusing the light returning through said Nipkow disk from said diffraction-limited spots in said specimen plane to produce a real image; and means for at least one of detecting and viewing said real image.

4. The real-time scanning optical macroscope or imaging system of claim 3 wherein said scan lens is a telecentric scan lens.

5. The real-time scanning optical macroscope or imaging system of claim 3 wherein said microscope objective is mounted in an optical subassembly which is further comprised of a means for parfocalizing said microscope objective and said scan lens.

* * * * *